United States Patent Office 3,325,560
Patented June 13, 1967

3,325,560
PREPARATION OF SYNTHETIC
LUBRICATING OILS
Donald H. Antonsen, Glen Mills, and Robert H. Johnson, Swarthmore, Pa., assignors to Sun Oil Company, Philadelphia, Pa., a corporation of New Jersey
No Drawing. Filed Apr. 3, 1964, Ser. No. 357,302
10 Claims. (Cl. 260—683.15)

This invention relates to the preparation of synthetic lubricating oils by polymerizing linear alpha olefins of the $C_6$–$C_{14}$ range utilizing as catalyst a combination of titanium tetrachloride and an aluminum alkyl compound. More specifically the invention is directed to conducting the polymerization in the presence of activated carbon, whereby deposition of the walls of the reactor of a film which normally forms as a degradation product of the catalyst is minimized or eliminated.

Linear alpha olefins of the $C_6$–$C_{14}$ range can be converted to polymeric lubricating oils having high viscosity index by polymerization at a temperature in the range of 0–50° C. utilizing as catalyst a combination of $TiCl_4$ and an aluminum alkyl compound in appropriate proportions. The alluminum alkyl compounds that can be used for this purpose include all of the following: (1) aluminum trialkyl ($AlR_3$), (2) aluminum dialkyl chloride ($AlR_2Cl$), (3) aluminum alkyl sesquichloride $$(AlR_{1.5}Cl_{1.5})$$

and (4) aluminum alkyl dichloride ($AlRCl_2$). For obtaining lubricating oil products the proportions of $TiCl_4$ to the aluminum alkyl compound should be such that the R:Ti molar ratio lies in the range of 0.5–5.0. The polymerization reaction is exothermic and hence means must be provided for removing heat from the reactor so that the temperature can be controlled.

In polymerizations effected by means of catalysts of the foregoing type, degradation of the catalyst occurs as the reaction proceeds and this is accompanied by the deposition of a brown, gummy film on surfaces within the reactor. This film appears to be composed of catalyst degradation products caked together with heavy oil components. Deposition of the film has distinctly adverse effects on the process. One undesirable effect is that the presence of the film on heat transfer surfaces makes it difficult to control the reaction temperaure. Further, the film has another adverse effect when additional batches of olefin monomer and fresh catalyst are charged to the reactor in that it reduces the activity of the new catalyst and considerably reduces the yield of polymeric oil product. A means for preventing this film deposition during the polymerizaton is highly desirable.

We have now discovered that formation of the film deposit can be eliminated or minimized by carrying out the polymerization in the presence of dry activated carbon. Only a small amount of the activated carbon is required but generally the amount should be in excess of 0.1% by weight based on the olefin charged. Typically amounts in the range of 0.4–1.0% are effective in eliminating the film deposit although larger amounts such as 2% or up to say 5% can be used if desired. Just how the activated carbon functions to prevent the deposition is not fully understood at the present time, but it is not due merely to the adsorptive properties of the activated carbon since other adsorbents such as silica gel, alumina gel and diatomaceous earth do not have this effect.

The present invention thus provides a process for making synthetic lubricating oils by polymerization of alpha olefins while avoiding the undesirable deposition of a film on surfaces within the reactor. The process comprises contacting a linear alpha olefin of the $C_6$–$C_{14}$ range at a temperature in the range of 0–50° C., more preferably 10–40° C., and in the presence of activated carbon with a catalyst system which is a combination of $TiCl_4$ and an aluminum alkyl compound selected from the following types:

(1) Aluminum trialkyl ($AlR_3$)
(2) Aluminum dialkyl chloride ($AlR_2Cl$)
(3) Aluminum alkyl sesquichloride ($AlR_{1.5}Cl_{1.5}$)
(4) Aluminum alkyl dichloride ($AlRCl_2$)

The proportions of $TiCl_4$ and aluminum alkyl compound are that the R:Ti molar ratio is in the range of 0.5–5.0. For each type of aluminum alkyl compound above shown there is a preferred range for the R:Ti molar ratio, as hereinafter specified. Contact of the catalyst system, obtained from the combination of $TiCl_4$ with any of the types of aluminum alkyl compounds specified above, with the alpha olefin charge causes the olefin to polymerize yielding a series of oligomers ranging from dimers to viscous oils. After the reaction is complete, the catalyst is killed and the used activated carbon and catalyst residues are separated in any suitable manner from the hydrocarbon product. The latter is then fractionally distilled to yield lubricating oil fractions of any selected boiling ranges. These polymeric oils have high viscosity indexes which generally are in excess of 125 and after hydrogenation constitute excellent oils for special applications such as jet aircraft lubricants, automatic transmission fluids, hydraulic oils and brake fluids.

While with each of the above-named types of aluminum alkyl compounds the R:Ti molar ratio can vary within the general range of 0.5–5.0, best results are obtained when the R:Ti ratios are as follows:

|  | R:ti ratio |
|---|---|
| $AlR_3$ | 0.6–3.0 |
| $AlR_2Cl$ | 1.6–5.0 |
| $AlR_{1.5}Cl_{1.5}$ | 1.2–3.8 |
| $AlRCl_2$ | 0.9–3.0 |

The R:Ti ratio of course is established by the proportion of the aluminum compound to the $TiCl_4$ employed. Generally the proportions used are such that the atomic ratio of Al to Ti is in the range of 0.8–2.5.

The number of carbon atoms in the alkyl (R) group of the aluminum compound is not particularly important. This group can, for example, vary in number of carbon atoms from one to ten. Preferably R is a straight chain alkyl group such as methyl, ethyl, n-propyl, n-butyl, n-hexyl, n-octyl, n-decyl or the like, although it can also be a branched chain alkyl group such as isobutyl or isopentyl.

The catalyst system, which basically comprises $TiCl_4$ and an aluminum alkyl compound of the types specified above, can be modified by the addition of certain types of oxygen-containing compounds to improve the viscosity-temperature characteristics of the oil products. The types of oxygen-containing compounds that can be used are as follows:

(1) oxiranes or methyl alkyl ethers,
(2) ditertiary alkyl peroxides,
(3) tetraalkyl silicates, and
(4) tertiary amine oxides or aromatic amine oxides.

When any of the first three types of modifiers listed above are employed, the amount used should be such that the atomic ratio of O to Al in the catalyst system is in the range of 0.3–0.9 and more preferably 0.4–0.8. However, when an amine oxide is used, the O to Al ratio should be in the range of 0.2–0.6. Incorporation of such amounts of these oxygen-containing compounds in the catalyst system results in oil products having better viscosity-temperature characteristics than when the oxygen-containing component is omitted.

When any of the above-named types of modifiers are used in catalyst systems made with aluminum sesquichloride, not only do the products have excellent viscosity-temperature characteristics but the presence of the activated carbon in the reaction mixture gives the unexpected effect of considerably increasing the viscosity of the polymeric oils produced. Such catalyst systems can therefore be used to prepare highly viscous oils having high viscosity indexes. The preferred types of catalyst modifiers are the oxiranes and methyl alkyl ethers. Oxiranes incorporated in the system for making such products conform to the formula:

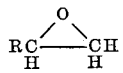

wherein R is either hydrogen or an alkyl group of 1–20 carbon atoms. Examples of oxiranes for use in modifying the catalyst are ethylene oxide, propylene oxide and the 1,2-epoxy derivatives of butane, n-pentane, isopentane, n-hexane, isohexanes, octanes, decanes, dodecanes, cetane, octadecanes, etc. When the oxygen-containing component of the catalyst system is a methyl alkyl ether, the alkyl group can be any of those specified above for the oxirane compounds. Examples are dimethyl ether, methyl ethyl ether, methyl propyl ether, methyl isobutyl ether, methyl hexyl ethers, methyl decyl ethers, etc.

The polymerization reaction can be carried out either with or without a solvent being employed. When no solvent is used, the olefin charge itself functions as the reaction medium and the catalyst is prepared in situ by adding the above-specified catalyst components to the olefin monomer. In the absence of a solvent there is a tendency for the catalyst to lose its activity more rapidly and its rate of deterioration depends upon its concentration; hence the olefin to $TiCl_4$ weight ratio preferably should be in excess of 100:1. Alternatively the reaction can be carried out in the presence of a solvent which can be a saturated hydrocarbon or certain types of halohydrocarbons, in which case olefin to $TiCl_4$ ratios below 100:1 can be used if desired without undue degradation of the catalyst occurring. When a saturated hydrocarbon solvent is used, it can be a paraffinic hydrocarbon, including both n-paraffins, and isoparaffins, or a naphthenic hydrocarbon or mixtures thereof. Examples of suitable hydrocarbon solvents are n-pentane, isopentane, hexanes, octanes, decanes, cyclohexane, methylcyclopentane, dimethylcyclohexane and the like.

The types of halohydrocarbons that can be used as solvents are halobenzenes having 1–2 halogen atoms, trihaloethanes, tetrahaloethanes, trihaloethylenes and tetrahaloethylenes, in which halohydrocarbons the halogen can be either chlorine or fluorine or both. Particularly suitable solvents are the monohalobenzenes, viz., chlorobenzene and fluorobenzene, and dihalobenzenes which are liquid at the reaction temperature such as ortho- and meta-dichlorobenzenes or difluorobenzenes. Examples of other halohydrocarbons that can be used are: methyl chloroform; 1,1,2 - trichloroethane; 1,1,2,2 - tetrachloroethane; trifluoroethanes, chlorodifluoroethanes; tetrafluoroethane; and similar ethylene derivatives containing 3–4 halogen atoms and which are chlorine and/or fluorine. In using a solvent the weight ratio thereof to olefin monomer generally is in the range of 1:2 to 4:1.

When the catalyst system is prepared using aluminum sesquichloride for the purpose of producing highly viscous oils by virtue of the presence of activated carbon in the system, the reaction can be conducted either without using a solvent or by employing a saturated hydrocarbon solvent. However, a halohydrocarbon solvent should not be used as it will prevent the formation of highly viscous products in spite of the presence of the activated carbon.

The weight proportion of olefin charge to titanium tetrachloride used in the reaction mixture can vary widely, ranging for example from 25:1 to 1000:1 depending upon the purity of the olefin charge, the absence or presence of a solvent, the type of solvent used and the type of aluminum alkyl compound employed.

The temperature for carrying out the reaction is in the range of 0–50° C. With either no solvent or a saturated hydrocarbon solvent a temperature of 10–30° C. preferably is used, while with a halohydrocarbon solvent the preferred temperature is 25–40° C. At temperatures below 0° C. substantially no reaction is obtained, while at temperatures above 50° C. the catalyst rapidly becomes deactivated.

After the polymerization reaction has been completed, the catalyst can be deactivated and its residues and the used activated carbon can be removed in any conventional or suitable manner. For example, the hydrocarbon product can be cleaned up by adding to the reaction mixture minor amounts of sodium carbonate and water and then filtering the mixture as described in Antonsen et al. United States Patent No. 3,090,777. The polymer product can then be distilled to separate synthetic oils of boiling ranges as desired. The synthetic oils obtained preferably are hydrogenated in known manner prior to use in lubricating applications. Typical conditions for liquid phase hydrogenation using a Raney nickel catalyst comprise temperatures in the range of 150–250° C. and a hydrogen pressure in the range of 1000–2500 p.s.i.g. The resulting hydrogenated products have outstanding oxidation stabilities and lubricating characteristics.

The following examples illustrate the invention more specifically:

Example I

A series of four runs was made in which n-octene-1 was polymerized by means of a catalyst system which was a combination of $TiCl_4$ and diethylaluminum chloride in a proportion such that the Al:Ti ratio was 1.0, corresponding to a ratio of R:Ti of 2.0. Runs 1 and 2 were made without any solvent and, respectively, without and with activated carbon present; while Runs 3 and 4 were made using chlorobenzene as solvent (1:2 solvent to monomer ratio by weight) and, respectively, without and with activated carbon present. The activated carbon was in finely divided form and had been dried by being heated overnight in an oven. Each run was carried out in a closed glass reactor which had been carefully cleaned and dried beforehand and which was provided with a stirrer. All runs were made at 30° C. with a reaction time of 20 hours and the weight proportion of octene-1 to $TiCl_4$ charged to the reactor was 300:1. The catalyst was then deactivated by mixing the reaction mixture with 20 g. of $Na_2CO_3$ and 25 ml. of water and the mixture was filtered. The hydrocarbon product was distilled to remove the unpolymerized octene and also the dimer fraction. Data for the total remaining oil (>650° F.) and also observations as to whether or not a film had formed on the reactor wall are shown in Table I.

TABLE I

| Run No. | Solvent | Wt. Percent Carbon | Reactor Wall Condition | Percent Conversion* of Octene | Wt. Percent Dimer in Product | Total Oil Above 650° F. | | |
|---|---|---|---|---|---|---|---|---|
| | | | | | | KV at 210° F., cs. | KV at 100° F., cs. | V.I. |
| 1 | None | None | Brown film | 49.4 | 20.4 | 54.4 | 464 | 12( |
| 2 | None | 0.6 | No film | 40.8 | 17.4 | 21.6 | 142 | 13( |
| 3 | Chlorobenzene | None | Brown film | 83.0 | 16.0 | 10.2 | 57.4 | 14( |
| 4 | Chlorobenzene | 0.6 | No film | 77.0 | 19.9 | 10.8 | 60.9 | 14( |

*Dimer plus oil distilling above 650° F.

The data in Table I show that a catalyst system which is a combination of $TiCl_4$ and diethylaluminum chloride is capable of producing oils of high viscosity index without any formation of a film deposit on the reactor wall when only 0.6% of activated carbon is present.

Example II

A series of four more runs on polymerizing n-octene-1 was made in which the catalyst system used was a combination of $TiCl_4$ and aluminum ethyl sesquichloride modified by means of propylene oxide. The proportions of these catalytic components were such that the Al:Ti ratio was 1.25, the R:Ti ratio was 1.88 and the O:Al ratio was 0.67. Otherwise the runs were made similarly to those in Example I, both with and without a chlorobenzene solvent and with and without activated carbon being present. Results are shown in Table II.

Example III

Another series of runs was made using the sequichloride-containing catalyst system described in the preceding example and substantially the same reaction conditions. In these cases, however, there was added to the octene-1 charge 0.12% (molar) of a diene, namely, isoprene. This was done to render the reaction mixture more prone to deposit a film during the polymerization, since increasing diene content will magnify such deposition. In five runs made the amount of activated carbon in the reaction mixture was varied from none to 0.6% by weight of the hydrocarbon as shown in Table III. After the runs were completed, the walls of the glass reactors were tested for color using the Munsell Color designation system. (See "The Measurement of Color," by W. D. Wright, pp. 172–175 (1958), published by the MacMillan Company.)

TABLE II

| Run No. | Solvent | Wt. Percent Carbon | Reactor Wall Condition | Percent Conversion of Octene | Wt. Percent Dimer in Product | Total Oil Above 650° F. | | |
|---|---|---|---|---|---|---|---|---|
| | | | | | | KV at 210° F., cs. | KV at 100° F., cs. | V.I. |
| 5 | None | None | Brown film | 82.9 | 13.7 | 25.1 | 171 | 136 |
| 6 | None | 0.6 | No film | 74.0 | 11.6 | 92.0 | 779 | 128 |
| 7 | Chlorobenzene | None | Brown film | 72.6 | 20.8 | 14.2 | 85.7 | 143 |
| 8 | Chlorobenzene | 0.6 | No film | 49.5 | 20.7 | 13.0 | 77.1 | 144 |

The data in Table II show that the film deposit can be eliminated by using 0.6% activated carbon when the aluminum compound employed in making the catalyst system is a sequichloride and also when an oxygen-containing catalyst modifier is used. The data further show that in the absence of a solvent and employing a sesquichloride aluminum component a large increase in viscosity of the product is obtained by using activated carbon, as evidenced by the 100° F. viscosity increase from 171 (Run 5) to 779 (Run 6). This effect is not obtained when the chlorobenzene solvent is present as shown by comparing Runs 7 and 8.

The total 650° F.+ oils from Runs 5 and 6 were vacuum distilled to a temperature of 280° C. at a pump pressure of 0.1 mm. Hg absolute. The yields, viscosities and methanol solubility characteristics of the resulting bottom fractions were determined to be as follows:

| | Run 5 | Run 6 |
|---|---|---|
| Yield of bottoms, percent of total oligomers | 39.0 | 60.2 |
| KV at 210°F | 119 | 196 |
| Methanol solubility | Soluble | Insoluble |

These results show that the presence of activated carbon in the reaction mixture (Run 6) results in a substantially higher yield of heavy bottoms and that the bottoms have higher viscosity than when activated carbon was absent (Run 5). The data also show that these bottoms are insoluble in methanol, which indicates a considerably higher molecular weight than was obtained in Run 5. These high molecular weight bottoms are useful as V.I. improvers for other oils.

This system designates color in terms of the following three factors: (1) hue, which is the basic color involved; (2) value, which indicates the degree between whiteness and blackness of the cast; and (3) chroma, which is a measure of the intensity of the basic color. Results are shown in Table III.

TABLE III

| Run No. | Wt. percent Carbon | Munsell Color Designation |
|---|---|---|
| 9 | None | 2.5Y 6/6 |
| 10 | 0.1 | 2.5Y 7/6 |
| 11 | 0.2 | 2.5Y 8/4 |
| 12 | 0.4 | N 9/0 |
| 13 | 0.6 | (¹) |

¹ No film.

In the designation 2.5Y 6/6 for the control run, 2.5Y represents hue, the numerator 6 represents value (higher values indicating greater lightness) and the denominator 6 represents chroma (lower values indicating less intensity). The results show that the presence of even as low as 0.1% activated carbon has some effect on inhibiting the film deposition, since the value of 7 shows an improvement in lightness of the film. At 0.4% activated carbon the small amount of film obtained was neutral in hue and had almost a white cast. The data show that the use of 0.6% activated carbon in the mixture completely eliminated film deposition.

When other linear alpha olefins of the $C_6$–$C_{14}$ range are substituted for octene-1 or when other catalyst systems as herein specified are substituted for those in the preced-

We claim:
1. Method of preparing synthetic lubricating oil which comprises contacting a linear alpha olefin of the $C_6$–$C_{14}$ range at a temperature in the range of 0–50° C., under reaction conditions at which essentially no solid polymer is formed, and in the presence of activated carbon in amount in excess of 0.1% by weight based on said alpha olefin and in amount to inhibit film deposition on reactor surfaces, with a catalyst system comprising $TiCl_4$ and an aluminum alkyl compound selected from the group consisting of $AlR_3$, $AlR_2Cl$, $AlR_{1.5}Cl_{1.5}$ and $AlRCl_2$ wherein the proportions of $TiCl_4$ and aluminum alkyl compound are such that the R:Ti molar ratio is in the range of 0.5–5.0, and thereafter separating from the reaction mixture olefin polymer of lubricating oil boiling range.

2. Method according to claim 1 wherein the aluminum alkyl compound is $AlR_3$ and the R:Ti molar ratio is in the range of 0.6–3.0.

3. Method according to claim 1 wherein the aluminum alkyl compound is $AlR_2Cl$ and the R:Ti molar ratio is in the range of 1.6–5.0.

4. Method according to claim 1 wherein the aluminum alkyl compound is $AlR_{1.5}Cl_{1.5}$ and the R:Ti molar ratio is in the range of 1.2–3.8.

5. Method according to claim 1 wherein the aluminum alkyl compound is $AlRCl_2$ and the R:Ti molar ratio is in the range of 0.9–3.0.

6. Method of preparing a viscous synthetic lubricating oil having a high viscosity index which comprises contacting a linear alpha olefin of the $C_6$–$C_{14}$ range at a temperature in the range of 0–50° C., under reaction conditions at which essentially no solid polymer is formed, and in the presence of activated carbon in amount in excess of 0.1% by weight based on said alpha olefin and in amount to inhibit film deposition on reactor surfaces, with a catalyst system comprising $TiCl_4$ and an aluminum alkyl sesquichloride in proportions such that the Al:Ti atomic ratio is in the range of 0.8–2.5, and thereafter recovering from the reaction mixture a viscous polymeric lubricating oil.

7. Method according to claim 6 wherein the catalyst system also contains an oxygen-containing organic compound selected from the group consisting of oxiranes having the formula

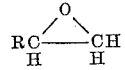

wherein R is selected from the group consisting of hydrogen and alkyl groups having 1–20 carbon atoms and methyl alkyl ethers in which the alkyl group has 1–20 carbon atoms, the amounts of said organic compound relative to said aluminum alkyl sesquichloride being such that the atomic ratio of O to Al is in the range of 0.3–0.9.

8. Method according to claim 7 wherein said organic compound is propylene oxide.

9. Method according to claim 7 wherein the amount of activated carbon is in the range of 0.4–2.0% based on said alpha olefin.

10. Method according to claim 6 wherein the amount of activated carbon is in the range of 0.4–2.0% based on said alpha olefin.

References Cited
UNITED STATES PATENTS 3,008,943 11/1961 Guyer _____ 260—683.15 X
3,206,523 9/1965 Antonsen _____ 260—683.15

DELBERT E. GANTZ, *Primary Examiner.*

R. H. SHUBERT, *Assistant Examiner.*